United States Patent Office 3,197,489
Patented July 27, 1965

3,197,489
6,16-DIFUNCTIONAL PROGESTERONES
Richard T. Rapala, Indianapolis, Ind., assignor to Eli Lilly and Company, Indianapolis, Ind., a corporation of Indiana
No Drawing. Filed Oct. 27, 1961, Ser. No. 148,028
12 Claims. (Cl. 260—397.1)

This invention relates to novel steroids and, more particularly, to 6,16-difunctional progesterones. The compounds of this invention exhibit excellent anti-endocrine activity and, in addition, are most useful as chemical intermediates.

In cases where an undesirable excess of steroidal hormone is being produced, treatment involves inhibition of the causative endocrine secretions with selected anti-endocrine agents. The therapeutic effectiveness of such agents could be enhanced substantially if inactivation thereof, caused by metabolic degradation, could be reduced, or delayed.

One of the objects of this invention is to provide highly effective anti-endocrine steroids—in particular, extremely effective anti-estrogens. Another object is to provide steroidal anti-endocrines which are quite resistant to metabolic degradation. A still further object is to provide novel steroids which, in addition to being excellent anti-endocrine agents, are highly useful chemical intermediates. These and other objects of this invention appear more fully hereinafter.

The novel steroids of this invention are 6,16-difunctional progesterones (including the 19-nor derivatives) of the following structural description: (1) a 6,16-difunctional progesterone wherein the functional groups substituted at carbon 6 and carbon 16 are electronegative moieties which can be the same or different, and (2) a 6,16-difunctional progesterone wherein the functional group substituted at carbon 6 is lower alkyl and that substituted at carbon 16 is an electronegative moiety, containing more than one atom. In both cases, the functional groups can be substituted in the α- or β-configurations of carbons 6 and 16. The following general formulae are representative of the novel progesterones of this invention:

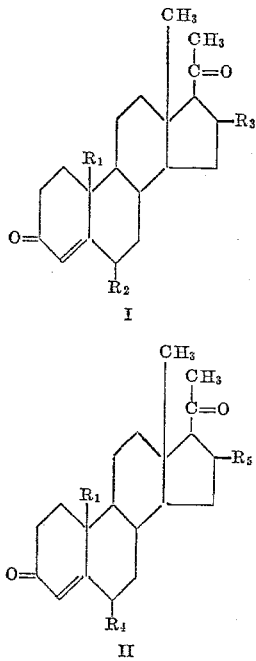

In Formula I, $R_1$ is hydrogen or methyl, and $R_2$ and $R_3$ are electronegative moieties, which can be the same or different, such as halo, and the like. In Formula II, $R_1$ is hydrogen or methyl, $R_4$ is lower alkyl (i.e., containing 1 to 4 carbons), and $R_5$ is an electronegative moiety containing more than one atom, such as cyano and nitroso. ($R_2$, $R_3$, $R_4$, and $R_5$ can be substituted in either the α- or β-configurations.)

Representative of the novel steroids of this invention are 6α,16α-dichloroprogesterone, 6α-methyl-16α-cyanoprogesterone, 6α-chloro-16α-cyanoprogesterone, 6α-methyl-16α-carboxylprogesterone, 6α-chloro-16α-carboxylprogesterone, and the corresponding 6α-, 16β-; 6β-, 16α-; 6β-, 16β-derivatives.

The term "electronegative moiety" as used herein indicates a group bearing a negative charge (or negative partial charge) when directly linked to carbons 6 and 16 of the progesterone moiety. Thus, preferred electronegative moieties of this invention are atoms or groups of atoms, such as halo, cyano, trihalomethyl, nitro, nitroso, carboxyl, sulfamyl, carbamido, carbalkoxy, and the like.

The following examples typify the preparation of the novel steroids of this invention.

Example I

To a solution of 250 mg. of 16α-carbomethoxypregnenolone acetate in 45 ml. chloroform, cooled at dry ice-acetone temperature, was added dropwise, while stirring, 1 cc. of 1 molar chlorine in carbon tetrachloride. The resultant solution was kept at —40° C. for one hour and then allowed to rise to about 25° C. slowly. Chloroform was added and the organic solution was extracted with 5 percent hydrochloric acid solution, then with a solution of 5 percent sodium carbonate, and, finally, copiously with water, followed by drying over sodium sulfate. Filtration and evaporation of the organic solvent gave a white, crystalline mass which, upon trituration with acetone and then recrystallization from methanol, gave the product, 16α-carbomethoxy-5α,6β-dichloropregnan-3β-ol-20-one acetate. This product was dissolved in 20 ml. of methanol and a solution of 225 mg. potassium bicarbonate dissolved in 1 ml. of water was added. The solution was refluxed for one hour, concentrated to a small volume and diluted with water, whereupon a solid precipitated. The solid was filtered, washed with water, and air dried. The resultant product was 16α - carbomethoxy - 5α,6β - dichloropregnan - 3β - ol-20-one. This 3β-ol derivative was oxidized in acetone solution at 0° C. with 0.2 cc. of a 6 N $CrO_3$-$H_2SO_4$-acetone solution. The reaction solution was stirred magnetically for about 5 minutes at 0° C. and then poured into 80 cc. of ice water. Filtration of the solid that formed and water washing, followed by drying in vacuo, furnished the crystalline 3-keto product. This latter derivative was dissolved in acetic acid, and dry hydrochloric acid was bubbled through the solution for 2 hours while stirring the solution in an ice bath. The reaction was stopped by pouring the reaction mixture into 75 gm. of ice and water. The solid that formed was filtered, washed with water, and dried. The resultant product was 6α-chloro-16α-carbomethoxyprogesterone.

In Example I, the starting material, 16α-carbomethoxypregnenolone acetate, was routinely obtained from commercial $\Delta^{16}$-pregnenolone by carboxylation followed by esterification of the carboxyl group with methanol and subsequent acetylation of the 3β-alcohol.

Example II

To 0.5 g. of 6-methyl-$\Delta^{5,16}$-pregnadiene-3β-ol-20-one were added 1.3 g. of sodium cyanide and 14 ml. of methyl alcohol. This mixture was refluxed for about 2.5 hours and then cooled and poured into ice. After about an hour, the finely divided precipitate that formed was extracted with ether, the extract washed with water and then dried over sodium sulfate. Evaporation of ether solvent and recrystallization from methanol yielded 6-methyl-16-cyano-$\Delta^5$-pregnen-3$\beta$-ol-20-one, M.P. 252–255° C.

*Analysis.*—Calculated for $C_{23}H_{33}O_2N$: C, 77.70; H, 9.36. Found: C, 77.79; H, 9.43.

This product was dissolved in 20 cc. acetone and cooled to ice temperature, whereupon 0.4 cc. of a 6 N $CrO_3$-$H_2SO_4$-acetone reagent was added. This solution was stirred for about 5 minutes and then poured into ice water, forming a precipitate. This mixture was filtered, and the solids washed with water and air dried to yield 6-methyl-16-cyano-$\Delta^5$-pregnen-3,20-dione. To 160 mg. of this material were added 20 cc. of methyl alcohol and 0.5 g. powdered potassium hydroxide. The solution was refluxed for about one-half hour and then cooled, whereupon concentrated sodium chloride solution was added until precipitation occurred. The solids were filtered and water added to the filtrate. This solution was then evaporated until precipitation occurred. The solid precipitate was filtered and then washed and dried to yield 6$\alpha$-methyl-16$\alpha$-cyanoprogesterone, which was a light-tan solid melting at 133–143° C.

*Example III*

To 1.5 g. 6-methyl-$\Delta^{5,16}$-pregnadien-3$\beta$-ol-20-one were added 0.5 g. potassium cyanide in 5 ml. water, and 20 ml. ethanol. This solution was refluxed for about 17 hours, and the extract washed with water. This solution was acidified with dilute HCl and then extracted with ethyl acetate. The extract was washed with water, dried, and then evaporated to the white solid 6-methyl-16$\alpha$-carboxypregnenolone, which exhibited no absorption in the ultraviolet region. This compound was converted to 6-methyl-16$\alpha$-carbomethoxypregnenolone by reaction with 80 cc. methyl alcohol in the presence of dry HCl, the product being obtained by pouring the resulting dark solution into ice water and then filtering the white precipitate that formed. This material was washed and then dried in air to produce 950 mg. of 6-methyl-16$\alpha$-carbomethoxypregnenolone. 500 mg. of this material were then added to 20 ml. toluene and 45 cyclohexanone. This mixture was distilled until 4.5 ml. distillate were collected. To the residue were added 270 mg. aluminum isopropoxide in 3 ml. toluene. The resulting solution was refluxed for 1.5 hours and then cooled. Benzene was added, followed by washing of the aggregate organic portion with dilute HCl and salt water, and water. Volatile components were removed by steam distillation and the desired product, 6$\alpha$-methyl - 16$\alpha$ - carbomethoxyprogesterone, was extracted with ether. The ether extract was washed and dried, and the desired product recovered by evaporating the ether.

*Example IV*

Dry HCl was bubbled for about 8 minutes into a stirred solution of 500 mg. $\Delta^{5,16}$-pregnadiene-3$\beta$-ol-20-one acetate in 21 ml. of dry chloroform maintained in an ice bath. The solution was evaporated in vacuo and the desired product, 16$\alpha$-chloropregnenolone acetate, was recrystallized from ether, M.P. 183–187° C. To 500 mg. of this product, dissolved in 45 ml. chloroform, was added 0.15 ml. pyridine. While stirring and maintaining the reaction mixture at about −80° C., 1.5 ml. of molar chlorine in carbon tetrachloride was added dropwise thereto. The solution was maintained at about −80° C. for about 1 hour and then allowed to warm to about 25° C., slowly. Chloroform was then added, followed by washing of the chloroform solution with dilute HCl solution, then 5 percent $Na_2CO_3$ solution, and finally water. The extract was dried and the solvents evaporated. The residue, upon trituration with acetone, yielded colorless, solid 5$\alpha$,6$\beta$,16$\alpha$-trichloropregnan-3$\beta$-ol - 20 - one acetate, which, upon recrystallization from ether and then methyl alcohol, weighed 240 mg. and melted at 218–221° C.

*Analysis.*—Calculated for $C_{23}H_{34}O_3Cl_3$: C, 59.42; H, 7.37. Found: C, 60.02; H, 7.55.

Utilizing the procedures of Example I, hydrolysis and oxidation converted this product to the 5$\alpha$,6$\beta$,16$\alpha$-trichloropregnane-3,20-dione, M.P. 193–197° C.

*Analysis.*—Calculated for $C_{21}H_{29}Cl_3O_2$: C, 60.77; H, 7.73. Found: C, 60.08; H, 6.96.

This product was then converted to the desired 6$\alpha$,16$\alpha$-dichloroprogesterone (M.P. 188–190° C.;

$$\lambda^{Ethanol}_{max.}\ 236\ m\mu$$

$\epsilon=14,850$) by bubbling dry HCl through an acetic acid solution containing the trichloro derivative.

*Analysis.*—Calculated for $C_{21}H_{28}O_2Cl_2$: C, 65.81; H, 7.36. Found: C, 65.40; H, 7.27.

The corresponding 6$\beta$,16$\alpha$-dichloroprogesterone (M.P. 193–197° C.;

$$\lambda^{Ethanol}_{max.}\ 239\ m\mu$$

$\epsilon=11,780$; found: C, 65.72; H, 7.50) was obtained from the 5$\alpha$,6$\beta$,16$\alpha$-trichloropregnan-3,20-dione by treatment with sodium acetate in acetone solution for about 3 hours.

*Example V*

To 320 mg. of 5$\alpha$,6$\beta$,16$\alpha$-trichloropregnan-3$\beta$-ol-20-one acetate were added 35 ml. of methanol in a solution of 320 mg. of potassium bicarbonate in 1.5 ml. of water. The solution was refluxed for about one hour. Five ml. of water were added; the mixture was partially evaporated; an additional 5 ml. of water added; and further evaporation effected. Upon cooling in ice, the product was filtered and washed with water, giving 303 mg. of 5$\alpha$,6$\beta$-dichloro-$\Delta^{16}$-pregnen-3$\beta$-ol-20-one, having a melting point of 184–193° C.

*Analysis.*—Calculated for $C_{21}H_{30}Cl_2O_2$: C, 65.43; H, 7.85. Found: C, 65.34; H, 8.06.

To this product in 30 ml. of methanol were added 732 mg. of sodium cyanide. The solution was refluxed for 3 hours and then poured into 100 gm. of an ice and water mixture and allowed to remain there for one hour. The product was then filtered and washed with water, giving 280 mg. of 5$\alpha$,6$\beta$-dichloro-16$\alpha$-cyanopregnan-3$\beta$-ol-20-one; transparent in the ultra-violet region. The oxidation of this material was carried out by dissolving it in 20 ml. of acetone containing 0.2 ml. of a 6 N $CrO_3$-$H_2SO_4$-acetone reagent while stirring the resulting mixture in an ice bath for 5 minutes. The reaction was stopped by pouring the reaction mixture into 100 gm. of ice. Filtration of the solid that formed and washing with water, followed by vacuum drying, furnished 272 mg. of the 3-keto derivative, having a melting point of 193–207° C. This product was dissolved in 20 ml. of methanol and 1.02 gm. of sodium acetate was added. The solution was refluxed for 2.5 hours, whereupon 50 percent of the solvent was evaporated in vacuo. Water was added to precipitate the solid. The mixture was cooled an ice, filtered and washed with water, and then dried in vacuo. The desired product, 206 mg. of 6$\beta$-chloro-16$\alpha$-cyanoprogesterone, was obtained. Recrystallization yielded a pure product having a melting point of 204° C.;

$$\lambda^{Ethanol}_{max.}\ 240\ m\mu,\ \epsilon=13,300$$

*Example VI*

The product, 6$\beta$ - chloro - 16$\alpha$ - cyanoprogesterone, obtained in Example V was converted to the 6$\alpha$-chloro derivative by dissolving 200 mg. of the 6$\beta$-chloro derivative in 9 ml. of acetic acid. Dry HCl was bubbled through this solution for a period of 30 minutes while cooling the solution in an ice bath. The reaction mixture was thereafter poured into a 75 gm. ice and water mixture. Filtration and washing with water gave the desired 6$\alpha$-chloro-16$\alpha$-cyanoprogesterone product.

The above examples present a variety of excellent procedures for preparing the compounds of this invention from various starting materials; however, all of the compounds of this invention can be prepared from readily available $\Delta^{16}$-progesterones or $\Delta^{16}$-pregnenolones employing well known, standard procedures.

Representative of other novel 6,16-progesterones of this invention are:

6α-methyl-16α-carbamidoprogesterone,
6α-chloro-16α-carbamidoprogesterone,
6α-methyl-16α-trichloromethylprogesterone,
6α-chloro-16α-trichloromethylprogesterone,
6α-methyl-16α-sulfamylprogesterone,
6α-chloro-16α-sulfamylprogesterone, and the 6α-,16β-; 6β-,16α; and 6β-,16β-analogues thereof, as well as the 19-nor-analogues of the aforementioned.

Further illustrative of the electronegative moieties of this invention are sulfate, nitrate, phosphate, phosphite, nitrite, sulfite, phosphoramido, aryol, acyl, carboxaldehyde, sulfone, sulfoxide, and the like.

As has been stated above, the novel 6-16-disubstituted progesterones of this invention are highly useful as chemical intermediates, since an 11α- or 11β-hydroxy group is introduced in position C–11 by the action of microorganisms, such as *Cunninghamella echinulata* or *Curvularia lunata*; for example, by employing the procedures set forth in U.S. 2,812,286 or 2,658,023. In this manner, the 6-16-difunctional progesterones of this invention are converted into highly useful corticosteroids. Although the above-mentioned patents employ specific micro-organisms and procedures, it is to be understood that the introduction of an 11-hydroxy group can be effected by any method presently known to the art.

In addition to the aforesaid utilities, the novel 6,16-progesterones of this invention are effective antifungal agents, when applied topically in varying concentrations —the specific concentration being dependent upon the severity of the fungal infection. Furthermore, the compounds of this invention exhibit central nervous system depressant activity, thereby being useful as hypotensive agents, for example.

I claim:

1. 6,16-dichloropregesterone wherein the configuration of the chloro groups is selected from the group consisting of α and β.
2. 6-methyl-16-cyanoprogesterone wherein the configuration of the methyl and cyano groups is selected from the group consisting of α and β.
3. 6-chloro-16-cyanoprogesterone wherein the configuration of the chloro and cyano groups is selected from the group consisting of α and β.
4. 6-methyl-16-carbomethoxyprogesterone wherein the configuration of the methyl and carbomethoxy groups is selected from the group consisting of α and β.
5. 6-chloro-16-carbomethoxyprogesterone wherein the configuration of the chloro and carbomethoxy groups is selected from the group consisting of α and β.
6. 6α-chloro-16α-carbomethoxyprogesterone.
7. 6α-methyl-16α-cyanoprogesterone.
8. 6α-methyl-16α-carbomethoxyprogesterone.
9. 6α,16α-dichloroprogesterone.
10. 6β,6α-dichloroprogesterone.
11. 6β-chloro-6α-cyanoprogesterone.
12. 6α-chloro-16α-cyanoprogesterone.

References Cited by the Examiner

UNITED STATES PATENTS 2,992,217  7/61  Armeria _____ 260—239.55
3,067,213  12/62  Ringold et al. _____ 260—397.4

OTHER REFERENCES

Graber et al.: Chemistry and Industry, No. 26, 1960, pp. 1478 and 1479.

LEWIS GOTTS, *Primary Examiner.*

MORRIS LIEBMAN, *Examiner.*